United States Patent
Syed et al.

(10) Patent No.: US 10,482,394 B2
(45) Date of Patent: Nov. 19, 2019

(54) LARGE-SCALE IN-DATABASE MACHINE LEARNING WITH PURE SQL

(71) Applicant: Google Inc., Mountain View, CA (US)

(72) Inventors: Umar Syed, Rahway, NJ (US); Sergei Vassilvitskii, New York, NY (US)

(73) Assignee: Google LLC, Mountain View, CA (US)

( * ) Notice: Subject to any disclaimer, the term of this patent is extended or adjusted under 35 U.S.C. 154(b) by 218 days.

(21) Appl. No.: 15/621,564

(22) Filed: Jun. 13, 2017

(65) Prior Publication Data

US 2018/0357565 A1    Dec. 13, 2018

(51) Int. Cl.

| | | |
|---|---|---|
| *G06F 17/30* | (2006.01) | |
| *G06N 20/00* | (2019.01) | |
| *G06N 5/02* | (2006.01) | |
| *G06F 16/25* | (2019.01) | |
| *G06F 16/242* | (2019.01) | |
| *G06F 16/2457* | (2019.01) | |
| *G06N 20/10* | (2019.01) | |

(52) U.S. Cl.
CPC ......... *G06N 20/00* (2019.01); *G06F 16/2433* (2019.01); *G06F 16/24578* (2019.01); *G06F 16/25* (2019.01); *G06N 5/02* (2013.01); *G06N 20/10* (2019.01)

(58) Field of Classification Search
CPC ........ G06N 20/00; G06N 5/02; G06N 99/005; G06F 16/2433; G06F 16/25; G06F 16/24578
See application file for complete search history.

(56) References Cited

U.S. PATENT DOCUMENTS

| | | | |
|---|---|---|---|
| 6,272,487 B1* | 8/2001 | Beavin | G06F 16/24545 |
| 6,694,321 B1* | 2/2004 | Berno | G06F 16/252 |
| 7,571,225 B2 | 8/2009 | Devraj et al. | |
| 9,569,464 B1* | 2/2017 | Crow | G06F 16/51 |
| 2012/0254153 A1* | 10/2012 | Abraham | G06F 16/353 707/716 |
| 2013/0144524 A1* | 6/2013 | Abraham | G06F 16/29 701/527 |
| 2015/0120699 A1 | 4/2015 | Faerber et al. | |

(Continued)

OTHER PUBLICATIONS

Batten, "Identifying Trends in SQL with Linear Regression", http://daynebatten.com, Aug. 3, 2015, retrieved on Jun. 13, 2017, 6 pages.

(Continued)

*Primary Examiner* — Greta L Robinson
(74) *Attorney, Agent, or Firm* — Dorrity & Manning, P.A.

(57) ABSTRACT

The present disclosure provides systems and methods for in-database generation of generalized linear models within a relational database. Generalized linear models form the basis of many machine learning algorithms and applications. In particular, in some implementations, the database commands that enable generation and use of the models include only pure SQL queries, thereby eliminating the need for user defined aggregates (UDAs), which are not offered by many cloud database service providers. For example, a set of client-side driver scripts can implement respective sets of pure SQL queries to import training data, generate and train the generalized linear model, and employ the model to generate inferences.

20 Claims, 7 Drawing Sheets

(56) References Cited

U.S. PATENT DOCUMENTS

2015/0294422 A1* 10/2015 Carver .................. G06Q 40/08
705/4
2018/0060738 A1* 3/2018 Achin .................... G06Q 10/04

OTHER PUBLICATIONS

Bittorf, "How-to: Use MADlib Pre-Built Analytic Functions with Impala", Cloudera Engineering Blog (http://blog.cloudera.com/), Oct. 30, 2013, retrieved on Jun. 13, 2017, 9 pages.

Campbell, "Incredibly Simple Regression Using Group by Categories in SQL", http://sqldatamine.blogspot.com/2013/09/incredibly-simple-regression-using.html, Sep. 10, 2013, retrieved on Sep. 10, 2013, 5 pages.

Demoncourt et al., "Machine Learning Algorithms for In-Database Analytics", 6.830 Term Project, Spring 2013, 17 pages.

Feng et al., "Towards a Unified Architecture for in-RDBMS Analytics", Proceedings of the 2012 ACM SIGMOD International Conference on Management of Data, Scottsdale, Arizona, May 20-24, 2012, pp. 325-336.

Kumar, "Multiple Linear Regression Function in SQL Server", https://stackoverflow.com/questions/28262939/multiple-linear-regression-function-in-sql-server, Feb. 1, 2015, retrieved on Jun. 13. 2017, 5 pages.

Matthews, "Simple Linear Regression in MS Access", https://www.experts-exchange.com/articles/2799/Simple-Linear-Regression-in-MS-Access.html, Jan. 8, 2011, retrieved on Jun. 13, 2017, 16 pages.

Nilsson, "Linear Regression in T-SQL", https://sites.google.com/site/sqlinvestments/Downhome/SQLStatProblem/part1knowledgerepresentationinprolog20 , Oct. 8, 2011, retrieved on Jun. 13, 2017, 2 pages.

Oracle White Paper, "Analytical SQL in Oracle Database 12c", Feb. 2015, 27 pages.

Rao, "Are There Any Linear Regression Function in SQL Server", https://stackoverflow.com/questions/2536895/are-there-any-linear-regression-function-in-sql-seiver, Mar. 29, 2010, retrieved on Jun. 13, 2017, 7 pages.

Tuzhilin et al., "Building and Querying Large Collections of Data Mining Models", Winter Information Systems Conference, David Eccles School of Business, University of Utah, Salt Lake City, Utah, Mar. 11-12, 2005, 16 pages.

Watzke et al., "In Database Linear Regression Using the CalcMatrix Table Operator", http://downloads.teradata.com/extensibility/articles/in-database-linear-regression-using-the-calcmatix-table-operator, Mar. 5, 2014, retrieved on Jun. 13. 2017, 8 pages.

Watzke et al, "In Database Multiple Variable Linear Regression Using the CM_Solve Table Operator", http://downloads.teradata.com/extensibility/articles/in-database-multiple-variable-linear-regression-using-the-cm-solve-table, Mar. 5, 2014, retrieved on Jun. 13, 2017, 6 pages.

Xin et al., "Shark: SQL and Rich Analytics at Scale" arXiv:1211.6176v1, Nov. 27, 20112, 12 pages.

Bubeck et al., "Convex Optimization: Algorithms and Complexity", Foundations and Trends in Machine Learning, vol. 8. Issue 3-4, 2015, pp. 231-357.

Candes et al., "Near-Ideal Model Selection by $\ell_1$ Minimization", The Annals of Statistics, vol. 37, Issue 5A, 2009, pp. 2145-2177.

Cohen et al., "Mad Skills: New Analysis Practices for Big Data", Proceedings of the VLDB Endowment., vol. 2, Issue 2, Aug. 2009, pp. 1481-1492.

Feng et al., "Towards a Unified Architecture for in-RDBMS Analytics", In Proceedings of the 2012 ACM SIGMOD International Conference on Management of Data, Scottsdale, Arizona, May 20-24, 2012, pp. 325, 336.

Greenplum Database, "The World's First Open Source Massively Parallel Data Warehouse", http://www.greenplum.org, retrieved on Jun. 17, 2017, 13 pages.

Hellerstein et al., "The Madlib Analytics Library or MAD Skills the SQL", Technical Report No. UCB/EECS-2012-38, Electrical Engineering and Computer Sciences Department, University of California at Berkeley, Apr. 3, 2012, 14 pages.

Jamil, Ad Hoc Association Rule Mining as SQL3 Queries, IEEE International Conference on Data Mining, San Jose, California, Nov. 29-Dec. 2, 2001, pp. 609-612.

Melnik et al., "Dremel: Interactive Analysis of Web-Scale Datasets", 36th International Conference on Very Large Data Bases, Singapore, Sep. 13-17, 2010, pp. 330-339.

Ng, "Feature Selection L1 vs L2 Regularization and Rotation Invariance", 21st International Conference on Machine Learning, Banff, Alberta, Canada, Jul. 4-8, 2004, 8 pages.

Olston et al., "Pig Latin: A Not-So-Foreign Language for Data Processing", 2008 International Conference on Management of Data, Vancouver, British Columbia, Canada, Jun. 9-12, 2008, pp. 1099-1110.

Ordonez et al., "Bayesian Classifiers Programmed in SQL", IEEE Transactions on Knowledge & Data Engineering, vol. 22, Issue 1, Jan. 2010, pp. 139-144.

Ordonez, "Integrating K-means Clustering With a Relational DBMS Using SQL", IEEE Transactions on Knowledge and Data Engineering, vol. 18. Issue 2, Feb. 2006, pp. 188-201.

Ordonez et al., "SQLEM: Fast Clustering in SQL Using the EM Algorithm", 2000 International Conference on Management of Data, Dallas, Texas, May 15-18, 2000, pp. 559-570.

Recht et al., "Hogwild! A Lock-Free Approach to Parallelizing Stochastic Gradient Descent", 24th International Conference on Neural Information Processing Systems, Granada, Spain, Dec. 12-15, 2011, pp. 693-701.

Ruping, "Support Vector Machines in Relational Databases", First International Workshop on Pattern Recognition with Support Vector Machines, Niagara Falls, Canada, Aug. 10, 2002, pp. 310-320.

Sarawagi et al., "Integrating Association Rule Mining with Relational Database Systems: Alternatives and Implications" Data Mining and Knowledge Discovery, vol. 4, Issue 2-3, Jul. 2000, pp. 89-125.

Sluis, "Condition Numbers and Equilibration of Matrices" Numerische Mathematik, vol. 14. Issue 1. Dec. 1969, pp. 14-23.

Teredata, www.teredata.com/products-and-services/analytics-from-aster-overview, retrieved on Jul. 5, 2017, 4 pages.

Weinberger et al., "Feature Hashing for Large Scale Multitask Learning", 26th Annual International Conference on Machine Learning, Montreal, Canada, Jun. 14-18, 2009, pp. 1113-1120.

Xin et al., "Shark: SQL and Rich Analytics at Scale", 2013 International Conference on Management of Data, New York, New York, Jun. 22-27, 2013, pp. 13-24.

Zou et al., "Regularization and Variable Selection via the Elastic Net", Journal of the Royal Statistical Society: Series B: Statistical Methodology, vol. 67, Part 2, 2005, pp. 301-320.

\* cited by examiner

LARGE-SCALE IN-DATABASE MACHINE LEARNING WITH PURE SQL

FIELD

The present disclosure relates generally to machine learning. More particularly, the present disclosure relates to large-scale in-database machine learning with pure Structured Query Language (SQL).

BACKGROUND

Today, a large number of interactions are mediated by automated systems, resulting in the generation of huge datasets. These huge datasets can be stored at cloud-based databases and associated management systems that handle all database-related administrative tasks. The abundance of data has also driven the widespread adoption of machine learning. Given these converging trends, it is desirable for cloud databases to include sophisticated machine learning algorithms as part of their core functionality.

SUMMARY

Aspects and advantages of embodiments of the present disclosure will be set forth in part in the following description, or can be learned from the description, or can be learned through practice of the embodiments.

One example aspect of the present disclosure is directed to a computer system to perform in-database machine learning. The computer system includes one or more processors and one or more non-transitory computer-readable media that store a set of pure SQL queries that, when executed by a query processing engine of a relational database management system, cause the relational database management system to generate a multivariate generalized linear model within a relational database by performing operations. The operations include generating a model table in the relational database that contains a weight for each unique feature associated with one or more of a plurality of examples included in a training data table included in the relational database. The operations include generating a score table in the relational database that contains a score for each of the plurality of examples. The operations include generating a single combined table from the training data table, the model table, and the score table. The operations include determining an updated weight for each unique feature in the model table based at least in part on the single combined table.

Another example aspect of the present disclosure is directed to a computer-implemented method to perform in-database machine learning. The method includes generating, by a relational database management system in response to one or more pure SQL queries, a model table in the relational database that contains a weight for each unique feature associated with one or more of a plurality of examples included in a training data table included in the relational database. The method includes generating, by the relational database management system in response to one or more pure SQL queries, a score table in the relational database that contains a score for each of the plurality of examples. The method includes generating, by the relational database management system in response to one or more pure SQL queries, a single combined table from the training data table, the model table, and the score table. The method includes determining, by the relational database management system in response to one or more pure SQL queries, an updated weight for each unique feature in the model table, wherein the updated weight for each unique feature is based at least in part on application of an update function to each row of the single combined table that includes such unique feature.

Another example aspect of the present disclosure is directed to one or more non-transitory computer-readable media that aggregately store a set of pure SQL queries that, when executed by one or more processors of a computer system, cause the computer system to perform operations. The operations include accessing a current model table in a relational database. The current model table contains a current weight for each of a plurality of unique features. The operations include updating a scores table in the relational database. The scores table contains a score for each of a plurality of examples. The operations include joining the scores table and the current model table with a single combined table in the relational database. The operations include generating a new model table in the relational database with an updated weight for each of the plurality of unique features. The updated weight for each unique feature is computed by application of an update function to each row of the single combined table that contains such unique feature.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

1. Overview

Generally, the present disclosure is directed to systems and methods for in-database generation of generalized linear models within a relational database. Generalized linear models form the basis of many machine learning algorithms and applications. In particular, in some implementations, the database commands that enable generation and use of the models include only pure SQL queries, thereby eliminating the need for user defined aggregates (UDAs), which are not offered by many cloud database service providers. For example, a set of client-side driver scripts can implement respective sets of pure SQL queries to import training data, generate and train the generalized linear model, and employ the model to generate inferences.

The systems and methods of the present disclosure take full advantage of the optimizations already built into relational database management systems (RDBMSs) and lead to a simple, practical, and general-purpose machine learning method. Experimentally, it has been demonstrated that the systems and methods described herein are more efficient than state of the art UDA-based algorithms, and scale to models with hundreds of millions of parameters without running into single machine bottlenecks. Thus, the systems and methods of the present disclosure enable interactive, exploratory, large-scale machine learning for users of SQL-based relational databases.

Figure 1A:
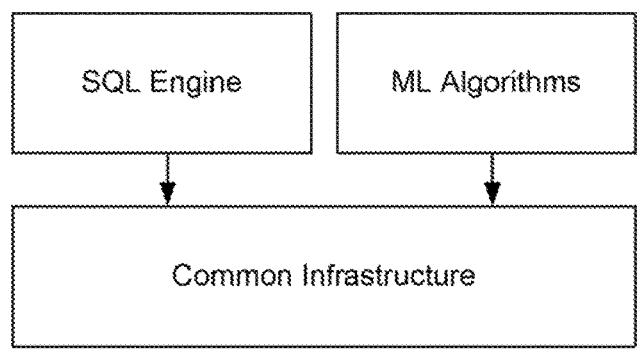
FIGS. 1A-C depict conceptual block diagrams of example approaches to in-database machine learning according to example embodiments of the present disclosure.
Figure 1B:
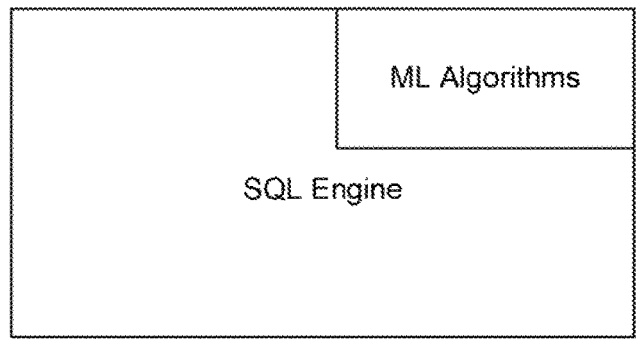
Figure 1C:
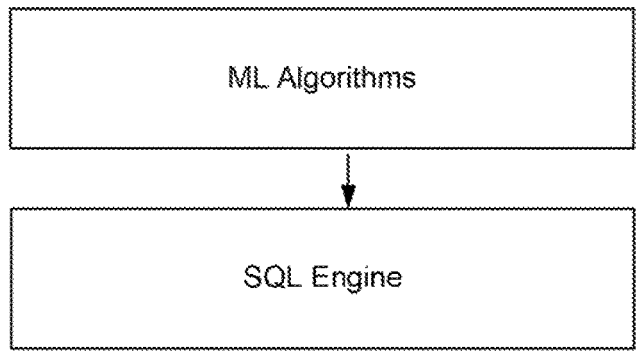

More particularly, existing approaches to in-database machine learning can generally be classified into three major categories, which range from requiring significant server-side development effort to involving only client code. FIGS. 1A-C respectively depict conceptual block diagrams the three approaches to in-database machine learning.

FIG. 1A depicts a conceptual block diagram of an example integrated system approach in which a query processing engine and machine learning system are built on top of a common infrastructure. Integrated systems process both SQL queries and execute machine learning algorithms within a single computational framework. A prominent example is Shark (a.k.a., Spark SQL), which is built using the Spark cluster computing engine. See, R. Xin, J. Rosen, M. Zaharia, M. J. Franklin, S. Shenker, and I. Stoica. Shark: SQL and rich analytics at scale. *CoRR*, abs/1211.6176, 2012.

FIG. 1B depicts a conceptual block diagram of a user-defined aggregates (UDAs) approach in which UDAs are used to extend the functionality of the query processing engine to support machine learning algorithms. UDAs are customized extensions to SQL that have been used to implement machine learning algorithms (see, e.g., J. Cohen, B. Dolan, M. Dunlap, J. M. Hellerstein, and C. Welton. Mad skills: New analysis practices for big data. *Proc. VLDB Endow.*, 2(2):1481-1492, August 2009; and X. Feng, A. Kumar, B. Recht, and C. Re. Towards a unified architecture for in-rdbms analytics. In *Proceedings of the 2012 ACM SIGMOD International Conference on Management of Data*, SIGMOD '12, pages 325-336, New York, N.Y., USA, 2012. ACM). One prominent example of the UDA approach is MADlib, an open-source project for in-database analytics. See J. M. Hellerstein, C. R, F. Schoppmann, Z. D. Wang, E. Fratkin, A. Gorajek, K. S. Ng, C. Welton, X. Feng, K. Li, and A. Kumar. The madlib analytics library or mad skills, the sql. Technical Report UCB/EECS-2012-38, EECS Department, University of California, Berkeley, April 2012. These extensions have been ported to many RDBMSs, and are offered by commercial providers such as Greenplum. A similar approach was taken in the following for implementing support vector machines, but their methods only work on very small datasets: S. Ruping. Support Vector Machines in Relational Databases, pages 310-320. Springer Berlin Heidelberg, Berlin, Heidelberg, 2002.

FIG. 1C depicts a conceptual block diagram of a pure SQL approach in which machine learning algorithms are implemented in SQL and the query processing engine itself is unchanged. Pure SQL implementations of machine learning algorithms are less common, and each one tends to focus on a single method. These include clustering, which is used for unsupervised learning (see, e.g., C. Ordonez. Integrating k-means clustering with a relational dbms using sql. *IEEE Trans. on Knowl. and Data Eng.*, 18(2):188-201, February 2006; and C. Ordonez and P. Cereghini. Sqlem: Fast clustering in sql using the em algorithm. In *In ACM SIGMOD Conference*, pages 559-570. ACM, 2000); association rule mining (see, e.g., S. Sarawagi, S. Thomas, and R. Agrawal. Integrating association rule mining with relational database systems: Alternatives and implications. *Data mining and knowledge discovery*, 4(2):89-125, 2000; and H. M. Jamil. Ad hoc association rule mining as sql13 queries. In *Data Mining, 2001. ICDM 2001, Proceedings IEEE International Conference on*, pages 609-612. IEEE, 2001); and Naive Bayes classification, an elementary method for supervised learning that is based on computing feature averages and counts (see, e.g., S. K. Pitchaimalai and C. Ordonez. Bayesian classifiers programmed in SQL. *IEEE Transactions on Knowledge & Data Engineering*, 22:139-144, 2009). Also, one-variable linear regression is relatively straight-forward to implement in pure SQL, since it amounts to computing a correlation.

Pure SQL implementations are obviously the most universal approach to in-database machine learning, as they can be run on any RDBMS, including a database-as-a-service. However, the conventional wisdom holds that pure SQL is inadequate for implementing sophisticated machine learning algorithms, and that complex methods are best added to relational databases either by redesigning the database from the ground up, or by extending its functionality via existing mechanisms like UDAs.

In the words of the MADlib developers: "Ideally, we would like MADlib methods to be written entirely in straightforward and portable SQL. Unfortunately, the portable core of 'vanilla' SQL is often not quite enough to express the kinds of algorithms needed for advanced analytics." See, J. M. Hellerstein, C. R, F. Schoppmann, Z. D. Wang, E. Fratkin, A. Gorajek, K. S. Ng, C. Welton, X. Feng, K. Li, and A. Kumar. The madlib analytics library or mad skills, the sql. Technical Report UCB/EECS-2012-38, EECS Department, University of California, Berkeley, April 2012.

In contrast to this conventional wisdom, the systems and methods of the present disclosure embody a contrary view which leverages pure SQL, which includes only queries, commands, or other language that complies with SQL standards. In particular, the present disclosure provides SQML (derived from SQL+ML): a general-purpose, large-scale, in-database machine learning system and associated techniques implemented entirely with pure SQL (e.g., as implemented by client-side driver scripts). SQML estimates generalized linear models, a large class of models for supervised machine learning that includes linear regression, logistic regression, and support vector machines as special cases. One example SQML learning algorithm described herein is based on state-of-the-art methods from convex optimization. The systems and methods described herein can scale to datasets with billions of examples and hundreds of millions of features—effectively, their scalability is only limited by the query processing capabilities of the database itself.

The systems and methods of the present disclosure have several advantages over existing in-database machine learning methods, especially for a database-as-a-service.

Because SQML is implemented in pure SQL, it does not need UDAs, a key advantage for database-as-a-service providers who have tailored their products to prioritize simplicity over extensibility. At the time of writing, neither Google BigQuery, Amazon RedShift, nor Microsoft Azure SQL Database support UDAs.

Even when UDAs are available, the UDA-based approach to in-database machine learning has several drawbacks. For example, many (if not all) of the UDA implementations assume that the learned model can fit in memory on a single machine (because the model is encoded as the aggregation state of the UDA). But datasets contained in modern databases can contain hundreds of millions of features, while the machines serving the database often sharply limit the amount of memory that can be consumed by a single query, since they process queries from many users simultaneously.

By representing models as disk-backed tables that are partitioned across many machines, SQML can scale to arbitrary model sizes. SQML is also far less sensitive to how the training data is ordered and distributed within the database. These advantages are discussed at greater length in Section 5.

While integrated systems like Shark, Aster Teradata's SQL-MapReduce (see, R. Xin, J. Rosen, M. Zaharia, M. J. Franklin, S. Shenker, and I. Stoica. Shark: SQL and rich analytics at scale. CoRR, abs/1211.6176, 2012; and Aster Teradata. http://www.teradata.com/products-and-services/analytics-from-aster-overview/. Accessed: 2017 May 1), Twitter's version of Apache Pig (see, C. Ordonez. Integrating k-means clustering with a relational dbms using sql. IEEE Trans. on Knowl. and Data Eng., 18(2):188-201, February 2006) and Hivemail provide unified environments for highly-scalable in-database analytics, users will incur high transition costs if they must migrate their data to a new system.

By contrast, because it can be implemented as a fully client-side solution, SQML allows any current database user to run sophisticated machine learning algorithms on their data without needing to switch databases or to coordinate with a database administrator. This greatly simplifies the deployment of machine learning tools to database-as-a-service customers.

SQML is a general-purpose machine learning system for estimating a large class of machine learning models, including the most widely-used models for supervised learning. By contrast, all other pure SQL implementations of in-database machine learning support only a single type of relatively primitive model, such as a Naive Bayes classifier.

Thus, the present disclosure provides novel systems and methods for estimating generalized linear model that operate entirely in-database and do not require UDA support. In addition to utilizing all of the in-database optimizations, in practice, the systems and methods described herein have additional advantages over previous state of the art in-database methods: (i) they are indifferent to the order that data is stored or accessed; (ii) they can support very large models (e.g., beyond the memory of a single worker); and, as a result, (iii) they are both faster and more accurate than UDA-based algorithms on large datasets.

2. Example Generalized Linear Models

In machine learning, a model is a function that takes as input an example, typically denoted by x, and outputs a prediction. A generalized linear model has the form:

$$x \mapsto p(w^T x), \qquad (1)$$

where the example $x \in \mathbb{R}^d$ is represented as a feature vector in d-dimensional space, the model is parameterized by a weight vector $w \in \mathbb{R}^d$, and the dot product $s = w^T x$ between the feature vector and weight vector is called the score. The prediction function p maps scores to predictions, and may depend on the type of the generalized linear model. For example, a linear regression model predicts real-values and may have $p(s) = s$, while a logistic regression model predicts probabilities and may have $p(s) = 1/(1+\exp(-s))$ (which is always a number between 0 and 1). Other types of generalized linear models are listed in Table 1.

TABLE 1

Types of generalized linear models

| Model | Prediction function | Loss function | Label type |
|---|---|---|---|
| Linear regression | $p(s) = s$ | $\ell(s, y) = \frac{1}{2}(s - y)^2$ | Real |
| Logistic regression | $p(s) = 1/(1 + \exp(-s))$ | $\ell(s, y) = \log(1 + \exp(-ys))$ | Binary |
| Poisson regression | $p(s) = \exp(s)$ | $\ell(s, y) = ys - \exp(s)$ | Count |
| Linear support vector machine | $p(s) = (s)$ | $\ell(s, y) = \max(0, 1 - ys)$ | Binary |

The mismatch between the score, s, computed by the model, and the true answer, y, is captured by the loss function, $\ell(s, y)$. For example, the loss function for linear regression can be the squared loss, $\ell(s, y) = \frac{1}{2}(s-y)^2$, and the loss function for logistic regression can be the log loss, $\ell(s, y) = \log(1+\exp(-ys))$. More example loss functions are listed in Table 1. Importantly, the loss function should be a convex function of the score (i.e., shaped like a bowl in high-dimensional space), so that it can be efficiently minimized.

A generalized linear model can be estimated by collecting a training set $(x_1, y_1), \ldots, (x_n, y_n)$, where each $y_i$ is the label for example $x_i$, and finding a weight vector w* that minimizes the following example objective $$f(w) = \sum_{i=1}^{n} \ell(w^T x_i, y_i) + \lambda_1 \|w_1\| + \frac{\lambda_2}{2} \|w_2\|, \qquad (2)$$

where the loss function $\ell(s, y)$ depends only on the type of the generalized linear model, as described above.

The last two terms in Eq. (2) are regularization terms that penalize the norm of the weight vector. By forcing the norms of the weights to be small, regularization limits the expressivity of the model (because small changes in the feature values will only cause a small change in the score), which prevents overfitting, i.e., learning a model that performs well on the training set but generalizes poorly to new examples. Note that $\lambda_1 > 0$ and $\lambda_2 > 0$ are user-selected constants, with larger values implying stronger regularization. In addition, while Eq. (2) provides one example objective function, other objective functions can be used instead.

Using the $L_1$ norm in addition to the $L_2$ norm, as in Eq. (2), is called elastic net regularization and has several advantages (see H. Zou and T. Hastie. Regularization and variable selection via the elastic net. *Journal of the Royal Statistical Society: Series B (Statistical Methodology)*, 67(2):301-320, 2005). Most importantly, the $L_1$ norm can be used to perform feature selection (see, e.g., A. Y. Ng. Feature selection, L1 vs. L2 regularization, and rotational invariance. In *Proceedings of the twenty-first international conference on Machine learning*, page 78. ACM, 2004), a critical capability when the training set contains hundreds of millions of features, which is a common occurrence in cloud databases. This issue will be revisited in Section 3.

Generalized linear models are widely studied in the statistics literature, and functions for estimating them from data are commonly available in statistical software packages (e.g., the 'glm' command in R). Statisticians refer to the prediction function as the inverse link function, and assume that it represents the conditional expectation of a given example's label, such that $p(w^T x) = E[y|x]$ for some joint distribution on (x, y). But the models described herein are not required to have this probabilistic interpretation. For example, the prediction function for a linear support vector machine is $p(s) = \text{sign}(s)$, which predicts a binary-valued label directly. In the present disclosure, any model satisfying Eq. (1) is considered a generalized linear model.

2.1 Categorical Features

SQML extracts the training set from a database table, such as the sample table for an example ad click-through rate prediction problem given in Table 2. The ith row of the table contains the information for labeled example $(x_i, y_i)$. One of the columns is designated the label column, in this case the click column, and the remaining columns are feature columns. The values in a numeric feature column, such as ad-size, are mapped directly to feature values. However, many columns in database tables contain categorical values, such as country and domain in Table 2, and for these columns the translation is less obvious.

TABLE 2

Example training set

| Country | Domain | Ad-size | Click |
|---------|--------|---------|-------|
| US | amazon.com | 10.7 | +1 |
| UK | ebay.co.uk | 12.0 | −1 |
| US | ebay.com | 25.5 | −1 |

The most common method for handling categorical values in generalized linear models is via one-hot encoding (also called using dummy variables in statistics): If a categorical feature column contains k distinct values, then a block of k binary-valued features is created (so the country column would give rise to a block of roughly 200 features), and for each example each feature in the block is set to 1 if the example contains the corresponding categorical value, and to 0 otherwise.

One-hot encoding leads to very sparse feature vectors, since only one feature per block per example is non-zero. It is important to note that, in at least some implementations, SQML does not explicitly represent these zeros; as will be illustrated in Section 4, the representation is also sparse. Also note that one-hot encoding even a handful of categorical feature columns can quickly lead to a huge number of binary-valued features, which highlights the importance of algorithms to scale to models beyond the memory of a single machine.

3. Example Algorithm and Analysis

One example SQML learning algorithm described herein computes a weight vector that approximately minimizes the objective in Eq. (2) using a variant of gradient descent. Standard gradient descent begins by setting $w_1 = 0$ and iteratively executing the update $$w_{t+1} = w_t - \eta \nabla f(w_t),$$

where f is the objective function to be minimized, $\nabla f$ is its gradient and $\eta > 0$ is a parameter known as the learning rate. Technically, because the $L_1$ norm in Eq. (2) is not differentiable, $\nabla f$ must be a subgradient, which is a generalization of the gradient for convex functions. However, this distinction is of no real practical consequence and it will be ignored in the remainder of the present disclosure. If f is convex, a suitable choice for $\eta$ will cause the sequence of $w_t$'s to converge to the minimum of f (see FIG. 2(a)).

In some implementations, standard gradient descent can be extended using preconditioning and a proximal step, two techniques borrowed from the optimization literature in order to handle the kinds of training sets and use cases typically found in cloud databases.

Preconditioning: Each iteration of gradient descent takes a step in the direction of the gradient, with the size of the step determined by the learning rate $\eta$. Ideally, the algorithm will take bigger steps in regions where the objective function is flat, and smaller steps in regions where it is curved. This leads to a dilemma when the objective is curved in one direction and flat in another (see FIG. 2(b)); when this happens it can be said that the objective is poorly conditioned or that it has a high condition number. A common cause of poor conditioning is mismatched units—consider two length-related features measuring the same physical quantity, but one expressed in miles, and the other expressed in inches.

Figure 2A:
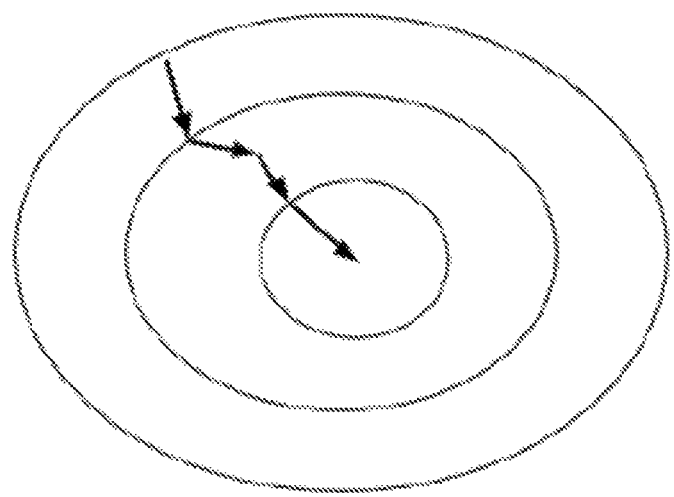
FIGS. 2A-B depict example graphical diagrams of gradient descent according to example embodiments of the present disclosure.
Figure 2B:
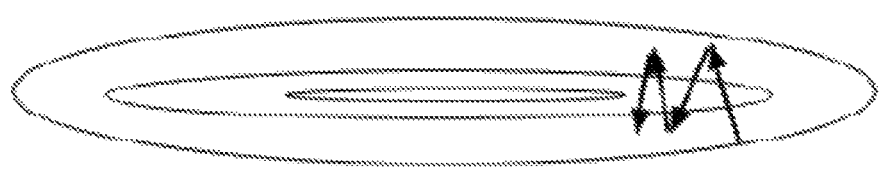

In particular, FIG. 2A depicts an example graphical diagram of gradient descent while FIG. 2B depicts an example graphical diagram of gradient descent on a poorly conditioned objective.

Another scenario that can lead to a poorly conditioned objective function, and one that is common for in-database machine learning problems, is when the training data contains several binary-valued features and some of them are non-zero far more often than others. This kind of skew can occur when the binary-valued features are generated by one-hot encoding a categorical feature column. For example, in a training set for a click-through rate prediction problem, the country column will usually contain 'United States' far more often than 'Bermuda.'

The optimization literature is replete with techniques for handling poorly conditioned problems. One of the most common, which can be used in conjunction with SQML, is to multiply the gradient by a diagonal matrix D that is specifically chosen to reduce the condition number.

Proximal step: Because databases are so often used for ad hoc, exploratory data analysis, one of the main use cases for in-database machine learning is to discover which features are most important for prediction. $L_1$ regularization plays a large role in this use case, since it is well-known that the weight vector $w^*$ that minimizes $f(w)$ in Eq. (2) tends to assign exactly zero weight to irrelevant features (see, e.g., E. J. Candes, Y. Plan, et al. Near-ideal model selection by L1 minimization. *The Annals of Statistics*, 37(5A):2145-2177, 2009). However, this property only holds for the minimizer itself, and although the $w_t$'s generated by standard gradient descent converge to the minimizer, they will, in general, have only nonzero entries, making it difficult for users to distinguish relevant from irrelevant features.

The solution, called proximal gradient descent, is to split each gradient descent iteration into two steps: a gradient step followed by the application of a 'soft-thresholding' operator that rounds small weights to zero.

Combining these two ideas, one example SQML learning algorithm that can be used is as follows. Given a learning rate $\eta$ and a diagonal preconditioning matrix D, let $\gamma \in \mathbb{R}^d$ be a vector such that $\gamma_j = \eta \lambda_1 D_{jj}$. Initialize $w_1 = 0$ and update each $w_t$ as follows:

$$w_{t+1} = S_\gamma(w_t - \eta D(\Sigma_{i=1}^n \ell'(w_t^T x_i, y_i) x_i + \lambda_2 w_t)), \quad (3)$$

where $\ell'(s, y)$ is the partial derivative of $\ell(s, y)$ with respect to s and the soft-thresholding operator S is defined $S_\gamma(u) = (\sigma(u_1, \gamma_1), \ldots, (\sigma(u_d, \gamma_d))$, where $$\sigma(a, t) = \begin{cases} a - t & \text{if } a > t \\ 0 & \text{if } -t \leq a \leq t \\ a + t & \text{if } a < -t \end{cases}.$$

Let $\kappa(D)$ denote the condition number when D is the preconditioning matrix, recalling that larger values indicate poorer conditioning. The following convergence theorem shows that with the right learning rate the algorithm attains exponential convergence. The result is standard and can be found in S. Bubeck et al. Convex optimization: Algorithms and complexity. *Foundations and Trends® in Machine Learning*, 8(3-4):231-357, 2015.

Theorem 1: Let w* be the minimizer of Eq. (2), and let $w_t$ be defined as in Eq. (3). Then there exists $\eta > 0$ such that $$\|w_t - w^*\|_2^2 \leq \exp\left(-\frac{t}{\kappa(D)}\right) \|w_t - w^*\|_2^2$$

The selection of the learning rate $\eta$ and the diagonal preconditioning matrix D can be explained as follows. The theoretically correct value for $\eta$ depends on the 'smoothness' of the loss function, but since this quantity is typically unknown, in practice a range of values can simply be tried and the one that works best can be chosen.

Theorem 1 indicates that D should be chosen so that the condition number $\kappa(D)$ is as small as possible. $D_{jj} = n_j$ can be set for each j, where $n_j$ is the number of examples with a non-zero value for feature j. This choice is justified by the following theorem, which is a novel result.

Theorem 2: If the loss function is the squared loss $\ell(s, y) = \frac{1}{2}(s-y)^2$, and all features are generated by one-hot encoding of categorical feature columns, then the diagonal matrix $D_{jj} = 1/n_j$ has the minimum condition number $\kappa(D)$ of any diagonal matrix.

Proof. Let $g(w) = \Sigma_i \ell(w^T x_i, y_i)$. The condition number $\kappa(D)$ is the ratio of the maximum and minimum eigenvalues of the matrix $D\nabla^2 g(w)$, where $\nabla^2 g(w)$ is the Hessian of g(w). The (j, k)th element of $\nabla^2 g(w)$ is $\nabla^2 g(w)_{jk} = \Sigma_i \ell''(w^T x_i, y_i) x_{ij} x_{ik}$, where $\ell''(s, y)$ is the second derivative of $\ell(s, y)$ with respect to s. For squared loss we have $\ell''(s, y) = 1$, and since every feature is binary valued we have that $\nabla^2 g(w)$ is the feature co-occurence matrix—each entry of the matrix counts the number of examples where both features are equal to 1. Suppose the features were generated by one-hot encoding k categorical feature columns. Then the jth row of the feature co-occurrence matrix contains exactly $kn_j$ non-zeros, and thus dividing the each row by $n_j$ results in every row having identical $L_1$ norm. In other words, the matrix $D\nabla^2 g(w)$ is row-equilibrated with respect to the $L_1$ norm. The theorem follows from Theorem 2.5 in A. Sluis. Condition numbers and equilibration of matrices. *Numerische Mathematik*, 14(1):14-23, 1969.

Because categorical features are so prevalent in databases, and because the squared loss is (locally) a reasonable approximation for any well-behaved loss function (by Taylor's theorem), we set $D_{jj} = 1/n_j$ when estimating any type of generalized linear model. This has been found to work well in practice.

4. Example Implementations

SQML can include a set of templated SQL queries paired with a Python driver script that customizes and issues these queries in the correct sequence in order to implement a learning algorithm such as, for example, the algorithm in Eq. (3), and also to compute a prediction function such as, for example, the function in Eq. (1). Each query can read from and write to a disk-backed table that may be partitioned across many machines. In this section example implementations of these queries are described, using a click-through rate prediction problem as a simplified running example. The queries can be written in BigQuery standard SQL, which is compliant with the SQL 2011 standard.

Figure 3:
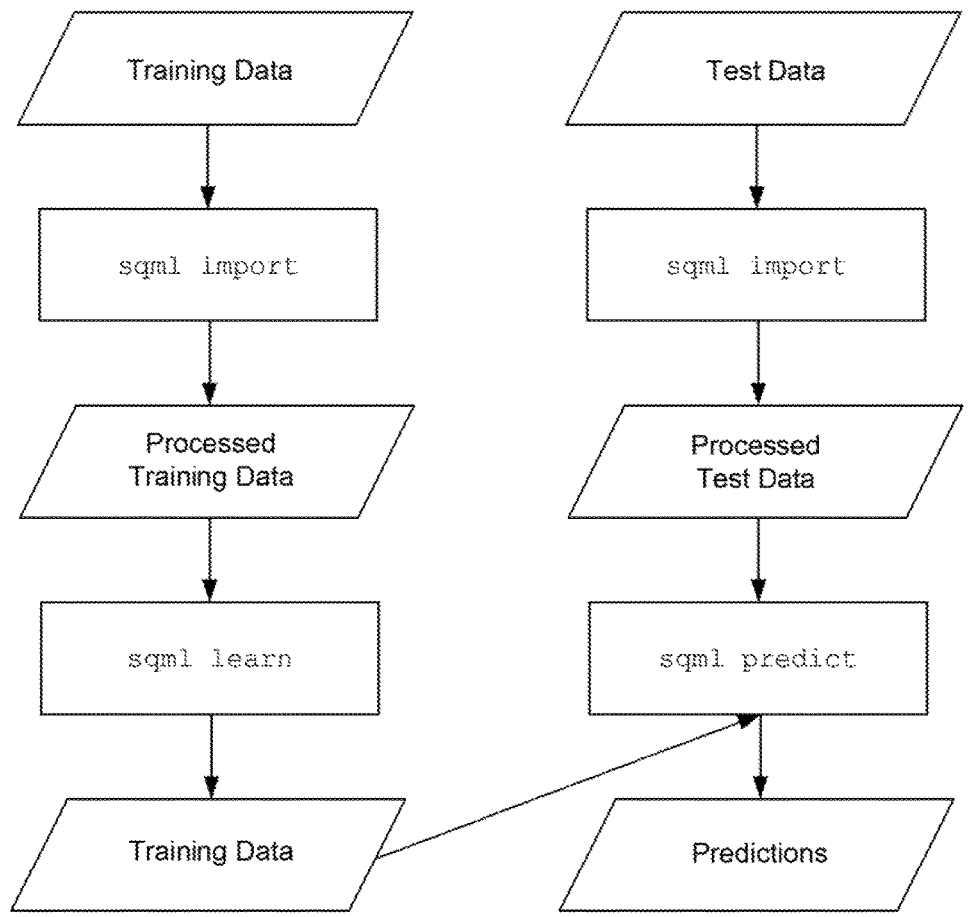
FIG. 3 depicts a flow chart of example SQML commands according to example embodiments of the present disclosure.

In some implementations, SQML can provide three commands to the end user: An "import" command that transforms training and test data from its native schema into a schema more suitable for further processing, a "learn" command that estimates a model from training data, and a "predict" command that applies the learned model to test data. The relationships between these commands are illustrated in FIG. 3. In particular, FIG. 3 depicts a flow chart of example SQML commands. Data elements are shown in parallelograms while data transformations are shown in rectangles.

4.1 Importing Data

Table 3 is a database table containing the training data used as a running example. It is similar to Table 2, except for simplicity of exposition the non-categorical feature column has been removed.

TABLE 3

| original_data | | |
|---|---|---|
| country | domain | click |
| US | amazon.com | +1 |
| UK | ebay.co.uk | −1 |
| US | ebay.com | −1 |

Each row of the original_data table contains information for one training example. The country and domain columns contain the respective features, and the click column contains the respective labels. As explained in Section 2, the feature columns are one-hot encoded, creating a binary-valued feature vector of length (# of countries)+(# of domains) per example. In order to represent these vectors sparsely, the import command can create a new table with one row per non-zero feature per example, and can mark features belonging to the same example with the same ID.

As one example, the command can be implemented via the following SQL query, which produces the data table (Table 4). Observe that the IDs can be independent random integers, and to ensure uniqueness they can be drawn uniformly from a large range. In some implementations, 128-bit integers can be used.

```
EXPORT data AS
SELECT
    id,
    feature,
    label
FROM (
    SELECT
        RAND_INT( ) AS id,
        CONCAT("country:", country) AS country,
        CONCAT("domain:", domain) AS domain,
        click AS label
    FROM
        original_data),
    UNNEST([country, domain]) AS feature;
```

TABLE 4 data

| id | feature | label |
|---|---|---|
| 123 | "country:US" | +1 |
| 123 | "domain:amazon.com" | +1 |
| 456 | "country:UK" | −1 |
| 456 | "domain:ebay.co.uk" | −1 |
| 789 | "country:US" | −1 |
| 789 | "domain:ebay.com" | −1 |

The import command can also create an initial_model table (Table 5) using the following query, which sets the initial weight of each feature to zero.

```
EXPORT intial_model AS
SELECT
    feature,
    0 AS weight
FROM
    data
GROUP BY feature;
```

TABLE 5 initial_model

| feature | weight |
|---|---|
| "country:US" | 0.0 |
| "country:UK" | 0.0 |
| "domain:amazon.com" | 0.0 |
| "domain:ebay.co.uk" | 0.0 |
| "domain:ebay.com" | 0.0 |

4.2 Learning a Model

The learn command can iteratively execute an update such as, for example, the update contained in Eq. (3). The update contained in Eq. (3) can be written in an equivalent but non-vectorized form to clarify how it will be translated to pure SQL. Given a weight vector w, each iteration can compute a new weight vector $\tilde{w}$ according to $$s_i = \Sigma_j w_j x_{ij} \text{ for all } i, \quad (4)$$

$$g_j = \Sigma_i \ell'(s_i, y_i) x_{ij} \text{ for all } j, \quad (5)$$

$$\tilde{w}_j = \text{update}(w_j, g_j, D_{jj}, \eta, \lambda_1, \lambda_2) \text{ for all } j, \quad (6)$$

where $\ell'(s, y)$ is the partial derivative of the loss function with respect to s and update( ) is simply an abbreviation:

$$\text{update}(w_j, g_j, D_{jj}, \eta, \lambda_1, \lambda_2) = \sigma(w_j - \eta D_{jj}(g_j + \lambda_2 w_j), \eta \lambda_1 D_{jj}).$$

Recall that the function $\sigma(\alpha, t)$ was defined immediately below Eq. (3).

Importantly, for a pure SQL implementation, the learn command can require that both the update( ) and $\ell'(s, y)$ functions are implementable as pure SQL expressions, using only built-in arithmetic and conditional operations. This is clearly true for update( ), and is also true for $\ell'(s, y)$ for virtually all generalized linear models of interest (see, e.g., examples in Table 1).

An example pure SQL implementation of one iteration of the learn command is now described, which proceeds in several phases. The iteration begins with a data table, such as Table 4, and a model table, such as Table 6.

TABLE 6 model

| feature | weight |
|---|---|
| "country:US" | $w_1$ |
| "country:UK" | $w_2$ |
| "domain:amazon.com" | $w_3$ |
| "domain:ebay.co.uk" | $w_4$ |
| "domain:ebay.com" | $w_5$ |

Phase 1: Compute Scores of Each Example

The first phase of the iteration implements Eq. (4) and computes the current score for every training example, storing the results in the scores table (Table 7). Note that the query below assumes for simplicity that all the features in original_data are categorical, and therefore if $x_{ij} \neq 0$ then $x_{ij} = 1$. If this weren't true, then the data table would also need to contain a value column that recorded non-zero feature values.

```
EXPORT scores AS
SELECT
    data.id AS id,
    SUM(model.weight) AS score
FROM
    data JOIN model
    ON data.feature = model.feature
GROUP BY id;
```

TABLE 7 scores

| id | score |
|---|---|
| 123 | $w_1 + w_3$ |
| 456 | $w_2 + w_4$ |
| 789 | $w_1 + w_5$ |

Again, note that in the event that one or more of the features are non-categorical, then the score for at least some ids would further rely upon a value column that recorded non-zero feature values.

Phase 2: Join Data, Model and Scores into One Table

The second phase can include gathering results from previous queries into one table for further processing and storing the output in the data_model_scores table (Table 8).

```
EXPORT data_model_scores AS
SELECT
    data.id AS id,
    data.feature AS feature,
    data.label AS label,
    model.weight AS weight,
    scores.score AS score
FROM
    data JOIN model
    ON data.feature = model.feature
    JOIN scores
    ON data.id = scores.id;
```

TABLE 8 data_model_scores

| id | feature | label | weight | score |
|----|---------|-------|--------|-------|
| 123 | "country:US" | +1 | $w_1$ | $w_1 + w_3$ |
| 123 | "domain:amazon.com" | +1 | $w_3$ | $w_1 + w_3$ |
| 456 | "country:UK" | −1 | $w_2$ | $w_2 + w_4$ |
| 456 | "domain:ebay.co.uk" | −1 | $w_4$ | $w_2 + w_4$ |
| 789 | "country:US" | −1 | $w_1$ | $w_1 + w_5$ |
| 789 | "domain:ebay.com" | −1 | $w_5$ | $w_1 + w_5$ |

Observe that in the previous two phases the data table was joined with the model table twice. The queries could have been structured slightly differently to avoid this redundant work, but simplified queries are presented here for ease of exposition.

Phase 3: Update Weights

The last phase can implement Eq. (5) and Eq. (6) and complete the iteration, outputting the updated model to the new_model table (Table 9). Note that, in the query below, the variables and functions beginning with $ are not SQL extensions, but macros to be replaced by user-selected constants or pure SQL expressions. Also observe that the call to update( ) uses the value for $D_{jj}$ recommended by Theorem 2.

```
EXPORT new_model AS
SELECT
    feature,
    $update(weight, g, 1 / count, $eta $lambda_1, $lambda_2) AS weight,
FROM (
    SELECT
        feature,
        SUM($loss_prime(score, label)) AS g,
        ANY_VALUE(weight) AS weight,
        COUNT(*) AS count
    FROM
        data_model_scores
    GROUP BY feature);
```

TABLE 9 new_model

| feature | weight |
|---------|--------|
| "country:US" | $\hat{w}_1$ |
| "country:UK" | $\hat{w}_2$ |
| "domain:amazon.com" | $\hat{w}_3$ |
| "domain:ebay.co.uk" | $\hat{w}_4$ |
| "domain:ebay.com" | $\hat{w}_5$ |

Importantly, the first three columns of the data_model_scores table are identical to the data table. So the above three phases can be repeated in the next iteration, but starting with data_model_scores in place of data and new_model in place of model.

4.3 Making Predictions

Predicting with a learned model is fairly straightforward. Given a data table, such as Table 4, and a model table, such as Table 6, an example query that predicts the label for each example in data is:

```
EXPORT predictions AS
SELECT
    ARRAY_AGG(data.feature) AS features,
    $p(SUM(model.weight)) AS prediction
FROM
    data JOIN model
    ON data.feature = model.feature
GROUP BY id;
``` where the macro $p( ) should be replaced with a pure SQL expression that implements the prediction function in Eq. (1).

5. Example Experiments

One primary contribution described by the present disclosure is a general-purpose, large-scale in-database machine learning system that can be deployed to databases that lack support for UDAs, such as a database-as-a-service. However, even when they are available, the approaches described herein have several demonstrable advantages over UDAs.

SQML was empirically compared to the algorithm used by Bismarck (see, X. Feng, A. Kumar, B. Recht, and C. Re. Towards a unified architecture for in-rdbms analytics. In *Proceedings of the 2012 ACM SIGMOD International Conference on Management of Data*, SIGMOD '12, pages 325-336, New York, N.Y., USA, 2012. ACM), one of the main components of the MADlib project, the best-known UDA-based machine learning system (see, J. M. Hellerstein, C. R, F. Schoppmann, Z. D. Wang, E. Fratkin, A. Gorajek, K. S. Ng, C. Welton, X. Feng, K. Li, and A. Kumar. The madlib analytics library or mad skills, the sql. Technical Report UCB/EECS-2012-38, EECS Department, University of California, Berkeley, April 2012.).

The aim of both SQML and MADlib is to enable sophisticated analytics for RDBMSs without transferring data to another runtime environment or requiring significant infrastructural modifications to the database itself.

Like SQML, Bismarck implements a single optimization algorithm that is applied to a large class of learning problems, rather than a separate custom algorithm for each problem. The algorithm is incremental gradient descent (IGD), which processes training examples one at a time and updates the model via a gradient step after each one. By contrast, SQML uses a batch gradient descent algorithm that scans the entire training set before applying a gradient step.

Incremental methods are in some instances preferred to batch methods for large-scale machine learning, since they make more rapid progress initially. However, using an incremental method for in-database machine learning has several disadvantages. First, the convergence rate is sensitive to how the data is ordered, and can be very slow if the ordering is pathological. Consequently, Bismarck either randomly subsamples the data, or performs an expensive shuffling step before starting. Second, incremental learning algorithms are inherently sequential, so if the training data does not fit in memory on one machine, Bismarck partitions the data across workers, runs a separate instance of incremental gradient descent on each worker, and then averages the models after each pass through the data. Since the workers don't communicate except via this averaging step, the final model can be of very poor quality if the data is partitioned across many workers (consider the extreme case where every worker has a single example). Bismarck partly addresses this problem by using shared memory UDAs, which allows each worker to read from and write to a single model during learning, greatly speeding up convergence. This approach closely resembles (lock-free) distributed stochastic gradient descent, a widely-used algorithm for large-scale machine learning (see, B. Recht, C. Re, S. Wright, and F. Niu. Hogwild: A lock-free approach to parallelizing stochastic gradient descent. In *Advances in Neural Information Processing Systems*, pages 693-701, 2011). However, the shared memory is only available to multiple threads running on one worker, not across workers.

Before describing some example experiments, brief comments on the non-Bismarck components of the MADlib project are provided. Several of the algorithms are expressed in terms of basic matrix operations, with the operations themselves implemented using either UDAs or pure SQL (see, J. M. Hellerstein, C. R, F. Schoppmann, Z. D. Wang, E. Fratkin, A. Gorajek, K. S. Ng, C. Welton, X. Feng, K. Li, and A. Kumar. The madlib analytics library or mad skills, the sql. Technical Report UCB/EECS-2012-38, EECS Department, University of California, Berkeley, April 2012).

However, these algorithms also rely on very expensive non-SQL subroutines. For example, the non-Bismarck linear and logistic regression algorithms perform matrix inversions in memory via a call to a standard numerical library, which takes $O(d^3)$ time, where d is the number of features. This is completely infeasible for large-scale models.

5.1 Experimental Setup

Both SQML and Bismarck's UDA-based incremental gradient descent (IGD) algorithm were implemented using Dremel, a database-as-a-service available internally at Google that supports UDAs (see, S. Melnik, A. Gubarev, J. J. Long, G. Romer, S. Shivakumar, M. Tolton, and T. Vassilakis. Dremel: Interactive analysis of web-scale datasets. *In Proc. of the 36th Conf on Very Large Data Bases*, pages 330-339, 2010).

Models were trained on two datasets collected from Google's online display advertising: Clicks on mobile display ad impressions (300 million examples), and bids on display ad impressions sold via auction in a real-time ad exchange (1.8 billion examples). Each impression was described by about dozen categorical features, such as userid, publisher, vertical, and so on. After one-hot encoding the datasets contained between 10-200 million binary features.

For the click data, a logistic regression model was trained to predict click-through rate, and for the auction data a linear regression model was trained to predict log(highest bid).

Both the datasets were partitioned into an equal number of shards, or subsets, and distributed across machines in the Dremel cluster. The number of shards determined the maximum number of workers that Dremel could recruit to process an SQL query in parallel.

The main execution loop for both the SQML and IGD algorithms was handled by a driver machine. For SQML, the driver simply issued the queries described in Section 4. Each of those queries generated intermediate results that were stored in disk-backed database tables partitioned into the same number of shards as the training data.

The driver for IGD copied the Bismarck approach to parallelization: After each worker finished executing the UDA on its assigned shard, the driver collected each worker's current model, averaged them together, and then retransmitted the averaged model to all the workers for the next pass through the data.

5.2 Results and Discussion

Figure 4:
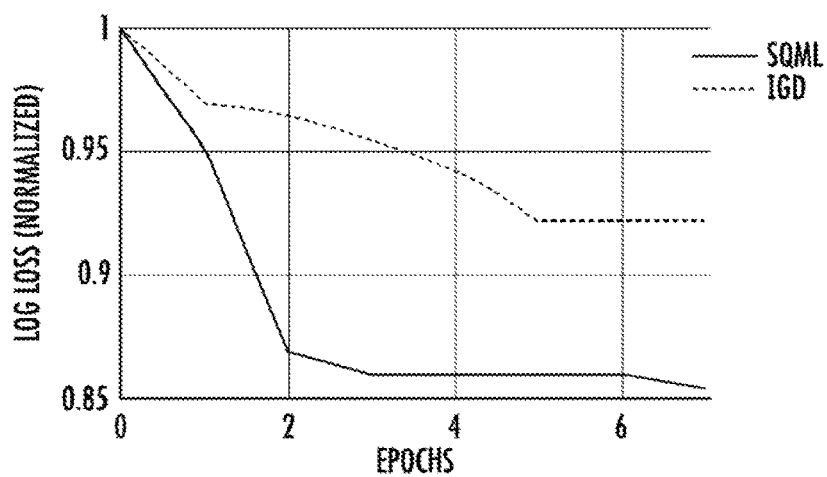
FIG. 4 depicts a graphical diagram of example experimental results according to example embodiments of the present disclosure.
Figure 5:
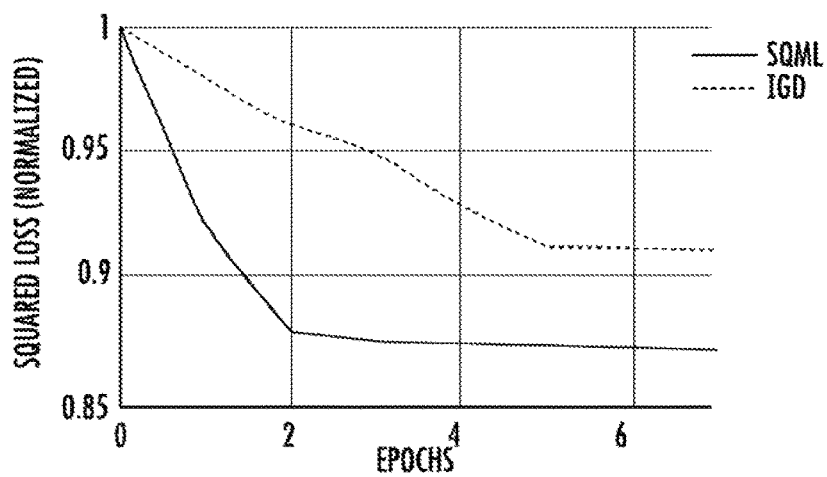
FIG. 5 depicts a graphical diagram of example experimental results according to example embodiments of the present disclosure.

FIGS. 4 and 5 show the value of the loss function on each dataset for each algorithm as a function of the number of passes through the dataset (a.k.a., epochs). Loss values have been normalized for confidentiality.

In particular, FIG. 4 illustrates performance of the SQML and IGD algorithms on the clickthrough rate prediction problem (logistic regression). Reported loss after each epoch (i.e., pass through the data) has been normalized so that 1 is equal to the loss of the best constant prediction.

FIG. 5 illustrates performance of the SQML and IGD algorithms on the bid prediction problem (linear regression). Reported loss after each epoch (i.e., pass through the data) has been normalized so that 1 is equal to the loss of the best constant prediction.

In these experiments, SQML converges faster, and to a lower loss function value, than IGD. These results have two principal explanations.

First, Dremel limits the resources available to any single query. Dremel is a service with thousands of concurrent users, and therefore it must impose relatively tight computational constraints on each user, far stricter that if the user had complete control over all the machines in the cluster. Dremel has two memory limits in particular that directly impacted the quality of the models learned by IGD: A limit on how much memory each worker can allocate to a processing a single query, and a limit on the amount of data that can be transferred between the driver and the workers. Because the datasets have hundreds of millions of features, in order to respect these limits the model was compressed via a technique called feature hashing that is widely-used in large-scale machine learning (see, K. Weinberger, A. Dasgupta, J. Langford, A. Smola, and J. Attenberg. Feature hashing for large scale multitask learning. In *Proceedings of the 26th Annual International Conference on Machine Learning*, pages 1113-1120. ACM, 2009). While feature hashing has been shown to gracefully degrade model quality as the compression ratio increases, some degradation is unavoidable. However, since the UDA approach requires holding the entire model in memory on each worker, and shuttling the model back and forth between the driver and the workers, no alternative to performing some kind of compression was readily apparent. SQML does not require model compression, since the models can be stored and processed in a fully distributed manner.

Second, while model averaging is a sound and common practice in distributed machine learning, its limitations are well-known, and are particularly acute when the training data contain many features that are both rare and informative. For example, in the bid prediction dataset, one of the most informative features is userid—some users are far more valuable to advertisers than others. However, any given userid will typically only appear in a small number of training examples, since no single user is responsible for many pageviews. Now consider a userid that always attracts very high bids, and let us examine how IGD will change the weight on its corresponding binary feature (generated by one-hot encoding) during a pass through the dataset. Suppose the dataset has been partitioned into k shards, and $k^+$ of these contain a training example where the feature is non-zero. Then $k^+$ out of k workers will increase the weight on the feature by some positive value—say, roughly w for some w>0—while the remaining workers will not change the weight, since the feature is equal to zero for all examples assigned to those workers. Therefore, in the averaging step, the weight change will be reduced to $$O\left(\left(\frac{k^+}{k}\right)w\right),$$

a very small value when $k^+ \ll k$, which will be the case if the userid is rare. By contrast, SQML will increase the weight by O(w) after one pass through the data. So IGD makes much slower progress than SQML.

Figure 6:
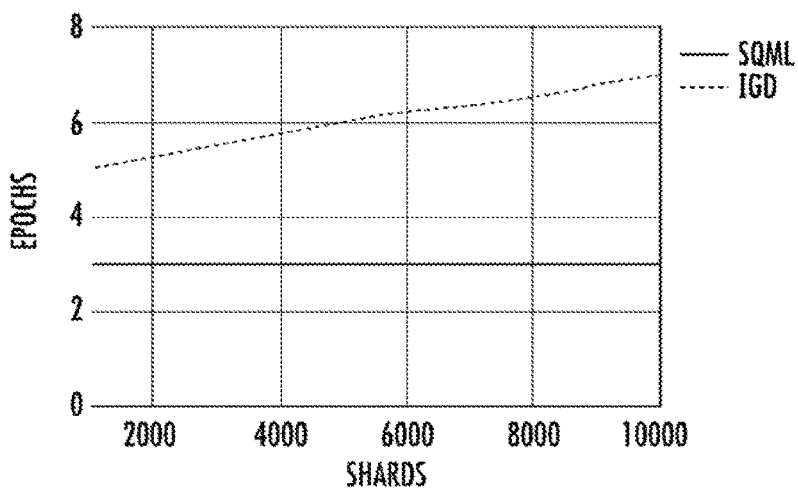
FIG. 6 depicts a graphical diagram of example experimental results according to example embodiments of the present disclosure.

To substantiate the second explanation, the bid prediction dataset was split into a varying number of shards, and both SQML and IGD were run until they 'converged' (i.e., until the first pass through the dataset that lowered the loss function by less than 1%). FIG. 6 shows the number of epochs (e.g., passes) needed to converge on the bid prediction problem as a function of the number of shards. IGD takes longer to converge as the number of shards increases, while SQML's convergence is not affected. This is expected, since as a batch algorithm, the SQML learning algorithm is invariant to how the data is distributed on disk.

Example Devices and Systems

Figure 7:
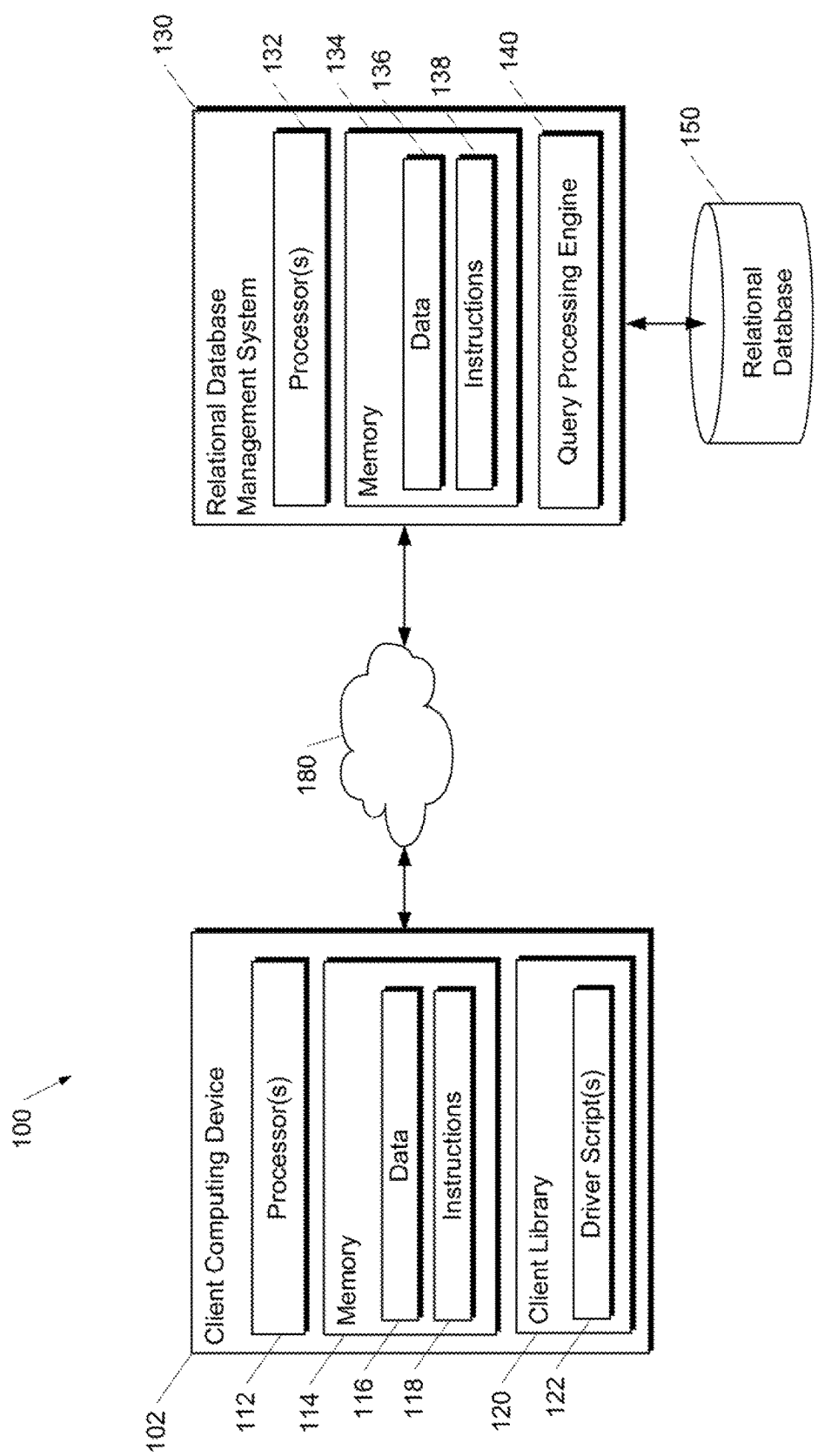
FIG. 7 depicts a block diagram of an example computing system according to example embodiments of the present disclosure.

FIG. 7 depicts a block diagram of an example computing system 100 according to example embodiments of the present disclosure. The computing system 100 includes a client computing device 102 and a relational database management system 130 in communication over a network 180. The relational database management system 130 manages a relational database 150.

The client computing device 102 can be any type of device, including a personal computing device and/or a client server device. Personal computing devices can include a laptop, a desktop, a smartphone, a tablet, an embedded computing device, a gaming console, etc.

The client computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The client computing device 102 can also include a client library 120. In some instances, the client library 120 can be provided to the client computing device 102 by an operator of the relational database management system 130. The client library can include sets of code that enable the client computing device 102 to interact with the relational database management system 130 (e.g., via an application programming interface (API)).

According to an aspect of the present disclosure, the client library 120 can include one or more driver scripts 122. The driver scripts 122 can include commands, queries, or other code that, when sent to the relational database management system 130, causes the relational database management system 130 to generate generalized linear models with the relational database 150.

In particular, according to an aspect of the present disclosure, the driver scripts 122 can contain only pure SQL queries or other pure SQL language or expressions. Thus, in some instances, the driver scripts 122 can be used with any number of different relational database management systems 130. Example driver scripts 122 are provided above in sections 4.1, 4.2, and 4.3.

The relational database management system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the relational database management system 130 to perform operations.

In some implementations, the relational database management system 130 includes or is otherwise implemented by one or more server computing devices. In instances in which the relational database management system 130 includes plural server computing devices, such server computing devices can operate according to sequential computing architectures, parallel computing architectures, or some combination thereof.

The relational database management system 130 can include a query processing engine 140. The query processing engine 140 can evaluate SQL queries to provide core services of storing, processing, and securing data to/from the relational database 150. In some implementations, the query processing engine 140 can include an SQL parser, a query optimizer, an execution engine, a metadata manager, an API handler, a query result returner, and/or other components.

The relational database 150 can store tables of data. Tables of data (or individual rows, columns, or entries thereof) can be related to each other. The relational database 150 can be one database or can be multiple, physically distributed databases. The relational database 150 can be backed up by multiple storage devices such as, for example, storage disks.

The query processing engine 140 can include computer logic utilized to provide desired functionality. The query processing engine 140 can be implemented in hardware, firmware, and/or software controlling a general purpose processor. For example, in some implementations, the query processing engine 140 includes program files stored on a storage device, loaded into a memory and executed by one or more processors. In other implementations, the query processing engine 140 includes one or more sets of computer-executable instructions that are stored in a tangible computer-readable storage medium such as RAM hard disk or optical or magnetic media.

Example Methods

Figure 8A:
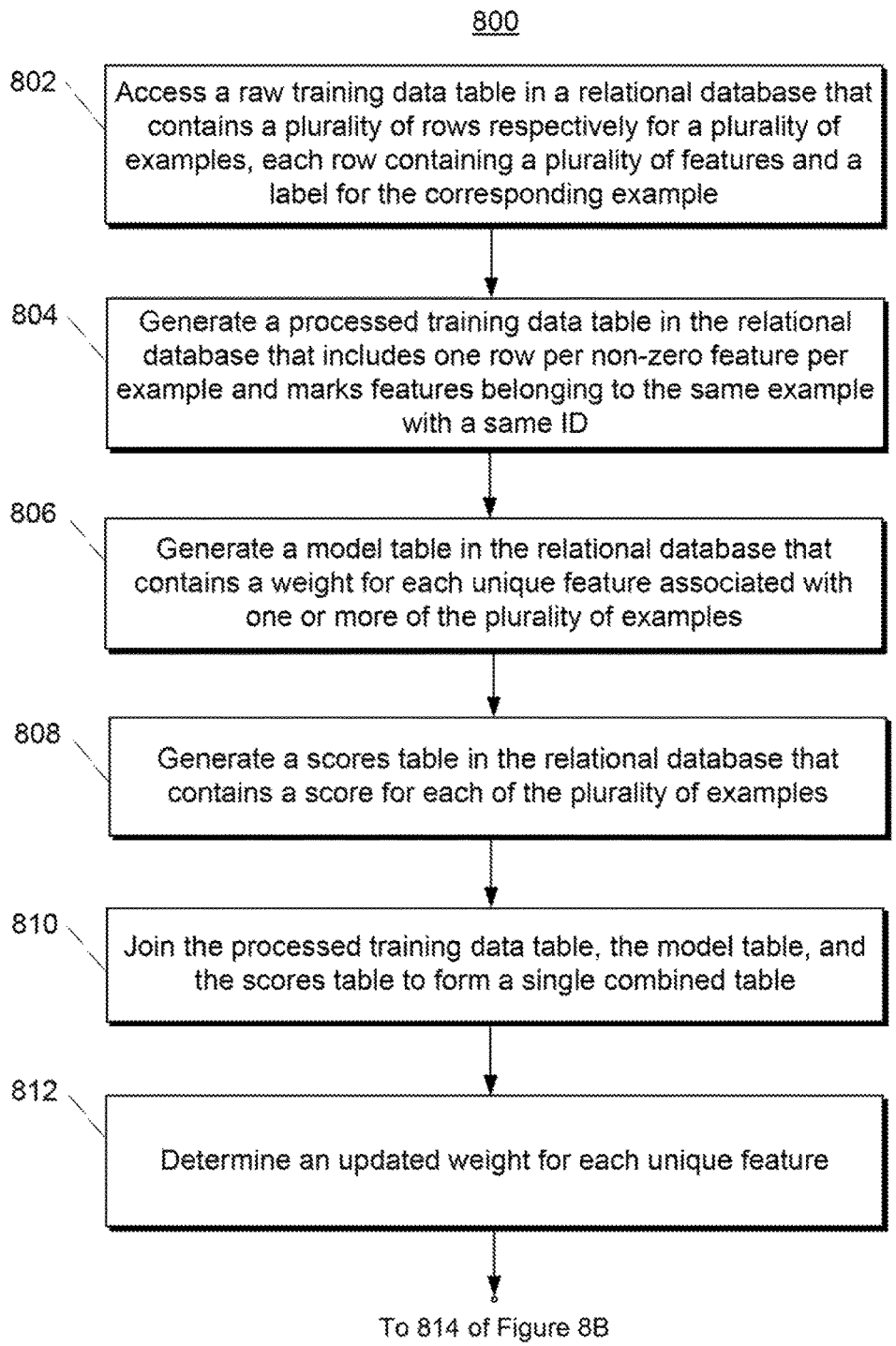
FIGS. 8A-B depict a flow chart diagram of an example method to generate generalized linear models according to example embodiments of the present disclosure.
Figure 8B:
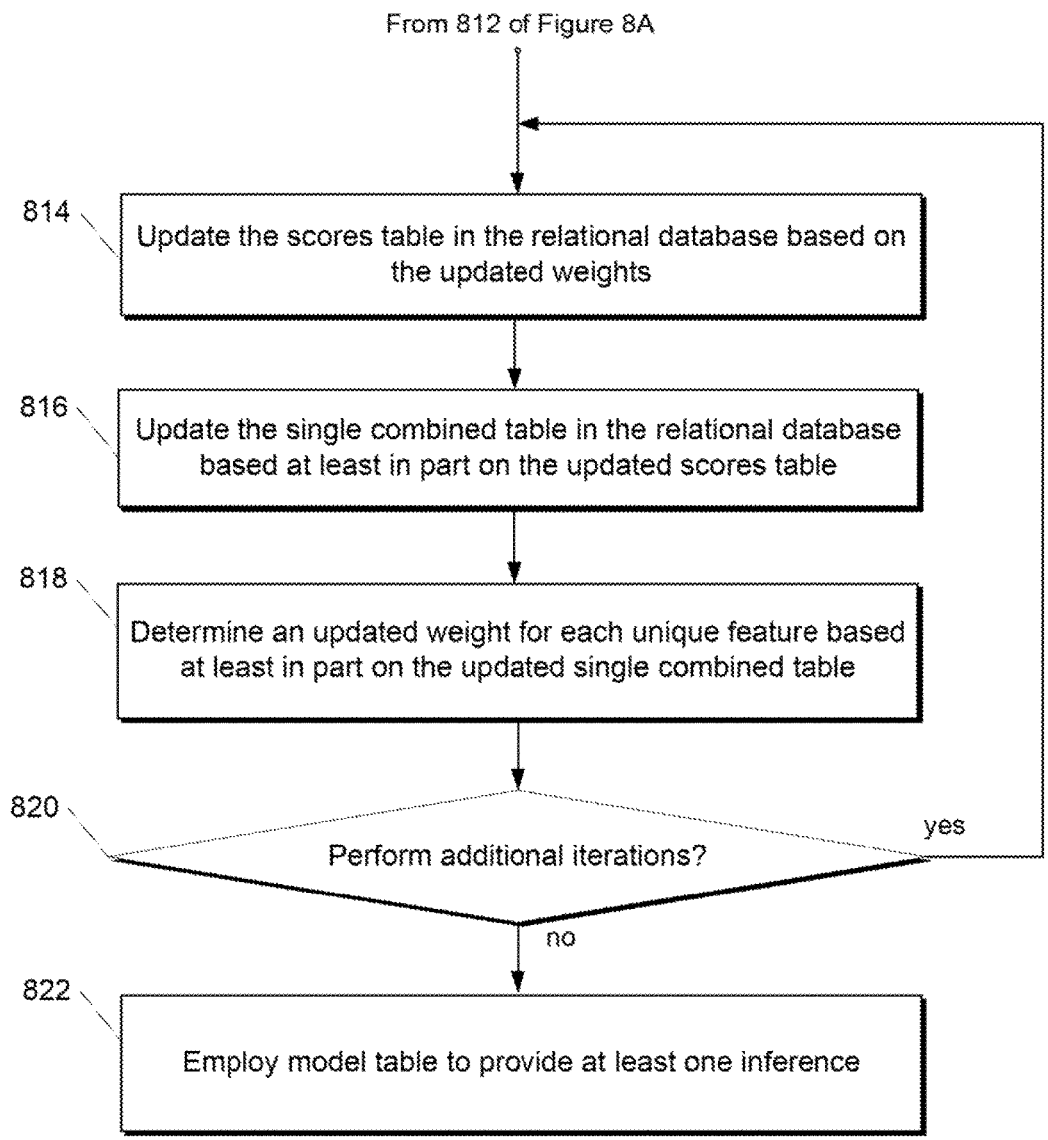

FIGS. 8A-B depict a flow chart diagram of an example method to generate generalized linear models according to example embodiments of the present disclosure.

Referring first to FIG. 8A, at 802, a computing system accesses a raw training data table in a relational database. The raw training data table contains a plurality of rows respectively for a plurality of examples. Each row contains a plurality of features and a label for the corresponding example.

At 804, the computing system generates a processed training data table in the relational database. The processed training data table includes one row per non-zero feature per example and marks features belonging to the same example with a same ID.

At 806, the computing system generates a model table in the relational database. The model table contains a weight for each unique feature associated with one or more of the plurality of examples.

At 808, the computing system generates a scores table in the relational database. The scores table contains a score for each of the plurality of examples.

At 810, the computing system joins the processed training data table, the model table, and the scores table to form a single combined table.

At 812, the computing system determines an updated weight for each unique feature. In some implementations, determining the updated weight for each unique feature at 812 can include applying an update function to each row of the single combined table that includes such unique feature. In some implementations, the update function includes only of pure SQL expressions.

In some implementations, determining the updated weight for each unique feature at 812 can further include updating the model table generated at 806 to update the weights stored in the model table. In other implementations, determining the updated weight for each unique feature at 812 can further include generating a new model table to store the updated weights.

After 812, method 800 proceeds to 814 of FIG. 8B.

Referring now to FIG. 8B, at 814, the computing system updates the scores table in the relational database based on the updated weights. For example, the updated model table or a new model table can be accessed to determine and update the scores in the scores table.

At 816, the computing system updates the single combined table in the relational database based at least in part on the updated scores table.

At 818, the computing system determines an updated weight for each unique feature based at least in part on the updated single combined table. In some implementations, determining the updated weight for each unique feature at 818 can include applying an update function to each row of the single combined table that includes such unique feature. In some implementations, the update function includes only of pure SQL expressions.

In some implementations, determining the updated weight for each unique feature at 818 can further include updating a current model table to update the weights stored in the model table. In other implementations, determining the updated weight for each unique feature at 818 can further include generating an additional new model table to store the updated weights.

At 820, the computing system determines whether additional iterations should be performed. If it is determined at 820 that additional iterations should be performed, then method 800 returns to 814. However, if it is determined at 820 that additional iterations should be performed, then method 800 proceeds to 822.

At 822, the computing system employs the model table to provide at least one inference.

Although FIGS. 8A-B depict example steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system to perform in-database machine learning, the computer system comprising:
   one or more processors; and
   one or more non-transitory computer-readable media that store one or more driver scripts that implement a set of pure SQL queries that, when executed by a query processing engine of a relational database management system, cause the relational database management system to generate a multivariate generalized linear model within a relational database by performing operations comprising:
   generating a model table in the relational database that contains a weight for each unique feature associated with one or more of a plurality of examples included in a training data table included in the relational database;
   generating a score table in the relational database that contains a score for each of the plurality of examples;
   generating a single combined table from the training data table, the model table, and the score table; and
   determining an updated weight for each unique feature in the model table based at least in part on the single combined table.

2. The computer system of claim 1, wherein the multivariate generalized linear model comprises a multivariate linear regression model, a multivariate logistic regression model, or a multivariate support vector machine.

3. The computer system of claim 1, wherein the computer system comprises:

the relational database; and the relational database management system that executes the set of pure SQL queries to generate the multivariate generalized linear model within the relational database.

4. The computer system of claim 3, wherein determining the updated weight for each unique feature in the model table based at least in part on the single combined table comprises:

determining the updated weight for each unique feature in the model table based at least in part on application of an update function to each row of the single combined table that includes such unique feature.

5. The computer system of claim 4, wherein the update function consists only of pure SQL expressions.

6. The computer system of claim 4, wherein execution of the set of pure SQL queries further causes the relational database management system to perform further operations, the further operations comprising:

performing a plurality of weight update iterations, wherein each weight update iteration comprises:
updating the score table in the relational database based at least in part on the updated weights;
updating the single combined table in the relational database based at least in part on the updated score table; and
updating the model table in the relational database based at least in part on the updated single combined table.

7. The computer system of claim 4, wherein the relational database comprises a plurality of storage disks and execution of the set of pure SQL queries further causes the relational database management system to perform further operations, the further operations comprising storing the model table as a disk-backed table partitioned across two or more of the plurality of storage disks.

8. The computer system of claim 4, wherein determining the updated weight for each unique feature in the model table comprises generating a new model table in the relational database, wherein the new model table contains a row for each unique feature across all of the plurality of examples, each row of the model table containing the updated weight for the corresponding feature.

9. The computer system of claim 8, wherein the updated weight contained in the new model table for each unique feature is determined by application of an update function to at least the score contained in each row that includes such feature in the single combined table.

10. The computer system of claim 4, wherein the one or more non-transitory computer-readable media further store a second set of pure SQL queries that, when executed by the query processing engine of the relational database management system, cause the relational database management system to perform operations comprising:

accessing a raw training data table contained in the relational database; and
generating a processed training data table based at least in part on the raw training data table, wherein the processed training data table includes a row for each unique combination of feature and example, and wherein the single combined table is generated from the processed training data table.

11. The computer system of claim 4, wherein the one or more non-transitory computer-readable media further store a second set of pure SQL queries that, when executed by the query processing engine of the relational database management system, cause the relational database management system to perform operations comprising:

providing at least one inference based at least in part on one or more of the updated weights in the model table.

12. The computer system of claim 1, wherein the one or more driver scripts comprise one or more client-side driver scripts.

13. The computer system of claim 1, wherein the one or more driver scripts comprise one or more Python driver scripts.

14. The computer system of claim 1, wherein the one or more driver scripts comprise one or more sets of code.

15. A computer-implemented method to perform in-database machine learning, the method comprising:

generating, by a relational database management system in response to one or more pure SQL queries contained in one or more driver scripts, a model table in the relational database that contains a weight for each unique feature associated with one or more of a plurality of examples included in a training data table included in the relational database;

generating, by the relational database management system in response to one or more pure SQL queries contained in the one or more driver scripts, a score table in the relational database that contains a score for each of the plurality of examples;

generating, by the relational database management system in response to one or more pure SQL queries contained in the one or more driver scripts, a single combined table from the training data table, the model table, and the score table; and determining, by the relational database management system in response to one or more pure SQL queries contained in the one or more driver scripts, an updated weight for each unique feature in the model table, wherein the updated weight for each unique feature is based at least in part on application of an update function to each row of the single combined table that includes such unique feature.

16. The computer-implemented method of claim 15, wherein the update function consists only of pure SQL expressions.

17. The computer-implemented method of claim 15, further comprising:

performing, by the relational database management system, a plurality of weight update iterations, each weight update iteration comprising:
updating, by the relational database management system in response to one or more pure SQL queries, the score table in the relational database based at least in part on the updated weights;
updating, by the relational database management system in response to one or more pure SQL queries, the single combined table in the relational database based at least in part on the updated score table; and
updating, by the relational database management system in response to one or more pure SQL queries, the model table in the relational database based at least in part on the updated single combined table.

18. The computer-implemented method of claim 15, further comprising:

storing, by the relational database management system, the model table as a disk-backed table partitioned across a plurality of storage disks of the relational database.

19. The computer-implemented method of claim 15, further comprising:

accessing, by the relational database management system in response to one or more pure SQL queries, a raw training data table in the relational database, wherein the raw training data table contains a plurality of rows respectively for the plurality of examples, each of the plurality of rows of the raw training data table containing a plurality of features and a label for the corresponding example; and generating, by the relational database management system in response to one or more pure SQL queries, a processed training data table in the relational database, wherein the processed training data table contains one row per non-zero feature per example and marks features belonging to the same example with a same ID;

wherein the single combined table is generated from the processed training data table.

20. One or more non-transitory computer-readable media that aggregately store one or more driver scripts that contain a set of pure SQL queries that, when executed by one or more processors of a computer system, cause the computer system to perform operations, the operations comprising:

accessing a current model table in a relational database, the current model table containing a current weight for each of a plurality of unique features;

updating a scores table in the relational database, the scores table containing a score for each of a plurality of examples;

joining the scores table and the current model table with a single combined table in the relational database; and generating a new model table in the relational database with an updated weight for each of the plurality of unique features, the updated weight for each unique feature computed by application of an update function to each row of the single combined table that contains such unique feature.

* * * * *